United States Patent [19]

Colecchio

[11] 4,080,782
[45] Mar. 28, 1978

[54] SWIVEL FOR CARGO BINDERS AND THE LIKE

[75] Inventor: Carl Colecchio, Lake City, Mich.

[73] Assignee: Lake City Manufacturing Co., Lake City, Mich.

[21] Appl. No.: 729,856

[22] Filed: Oct. 4, 1976

[51] Int. Cl.² .............................................. B21L 13/00
[52] U.S. Cl. .......................................... 59/9; 29/443; 29/505; 29/511; 59/95; 254/78; 403/165
[58] Field of Search ........................... 59/9, 95, 21, 35; 72/377; 403/284, 165, 164, 79; 29/437, 442, 417, 505, 511, 517; 254/78; 24/68 CT; 294/82 R, 85

[56] References Cited

U.S. PATENT DOCUMENTS

| 439,860 | 11/1890 | Breul | 59/95 |
| 515,023 | 2/1894 | Salathe | 59/95 |
| 874,618 | 12/1907 | Oster | 59/9 |
| 916,127 | 3/1909 | Eldridge | 59/95 |
| 1,316,877 | 9/1919 | Clarkson | 59/9 |
| 2,195,124 | 3/1940 | Skoverski | 59/9 |
| 2,564,821 | 8/1951 | Smith | 254/78 |

*Primary Examiner*—C.W. Lanham
*Assistant Examiner*—Gene P. Crosby
*Attorney, Agent, or Firm*—Miller, Morriss and Pappas

[57] ABSTRACT

A swivel having a socket, an eye element formed in a bifurcated manner and in retention of a terminal tool such as a hook element, and the socket forged with a clearance closure in retention of the eye element whereby the eye is free to turn and limitedly pivot but is restrained from removal from the socket. The socket is formed as a part of a chain binder or the like and is useable on either of or both the clevis and bar ends of such binders.

2 Claims, 6 Drawing Figures

SWIVEL FOR CARGO BINDERS AND THE LIKE

The present invention is directed to a new and improved swivel structure primarily useful in chain binders or load binders but also useful in other high load or stress situations in which a swivel and hook is desirable. The present structure greatly improves prior swivel structures which were primarily formed around an eye element that is closed and which must then require the opening of the eye or the hook opening and subsequent welding to be effective. In many instances, rather than to break the eye or the hook and reweld it, it has been the practice to add an intermediate chain link to the eye so that the chain link can be broken and welded connecting the eye on one side and the hook on the other. In such construction the weakest part of the system is at the closing weld and field failures have occurred at these weld points. Despite the forged character of all parts in the prior art, the weld afforded the weak point in the systems.

In the present invention it is a principal object to avoid the necessity for using any links of chain intermediate the eye and hook and to provide a swivel which is strong, effective, and with no welds between hook and socket to provide a weak point.

The difficulties with the weld is that the weld heat destroys the advantage of forging and embrittles the metal in the link or part and can result in fracture or other metal failure under stress.

THE PRIOR ART

The closest prior art is easily distinguished by the present product and process for manufacture of the swivel but the prior art is fairly represented by U.S. Pat. Nos. 361,683 to J. G. Eckhart; 556,929 to W. A. Jameson; 935,627 to J. G. Owen; 1,423,244 to E. Y. Moore; 2,434,318 to L. Haubert for load binders or cargo hold downs; 3,352,582 to R. A. Mankin (closing a swivel socket); 3,492,033 to C. R. Mueller; and 3,504,937 to V. Panovic.

IN THE DRAWINGS

GENERAL DESCRIPTION

In general the swivel of the present invention is a combination structure in which a terminal implement such as a hook or other stress transmitting tool is supported in an eye piece initially forged open and closed on the terminal implement and inserted in a socket formed in the terminal end of a tension transmitting link such as the bar or clevis end of a cargo chain binder as used by truckers and transportation people to tension and connect the ends of chain supporting loads or cargo in transit. It is significant that in the present invention of the swivel combination, the parts are all forged and are unweakened by any welding as formerly seen in swivels having a fully closed eye, a hook and an intermediate chain link or links, in which one or both require breaking and rewelding for integration in the swivel combination.

The invention also embodies the process of manufacture of the swivel product in which all forged parts, one being an open eye are connected together in the form of a swivel supporting a hook or other working terminal implement.

In the process the hook or terminal implement is finish forged to define a support opening therethrough. Then an eye piece is forged open in a general U-shape with the two ends of the eye piece forming mating pieces of approximately equal thickness and each having enlargements at the terminal end. This allows the open eye piece to be inserted in the support aperture of the hook and the bifurcated ends of the eye piece are closed together as by heat and pressure and without interruption with the forge strength and the closed end is then inserted in an open ended socket provided in the end of either a clevis or bar of a cargo chain binder. This results in a shorter chain binder. The socket is forged open and the edge of the open socket is flanged outwardly so that a final forging or coining operation acting on the flange closes the socket stock on the shank of the eye piece and secures the eye piece against removal while providing clearance for swivelling. The draft surrounding the enlargements provides a substantially conic surface which corresponds in general with a conical annulus formed by the closing of the socket flange radially inward. This flange thus provides a conic thrust seat urging the eye piece closed under stress and resisting with full strength any tendency to pull out. This also permits limited pivoting in the socket dependent upon the amount of clearance as between socket and shank and enlargement.

Operationally, where such swivels are employed, the manufacture has been simpler of the chain binders and the performance of the swivels is materially improved with savings of the cost of one or more intermediate chain links and avoidance of the need for weld heats. Forge strength is thus maintained. Other advantages and operational credits will be appreciated as the detailed description proceeds.

SPECIFIC DESCRIPTION

Figure 1:
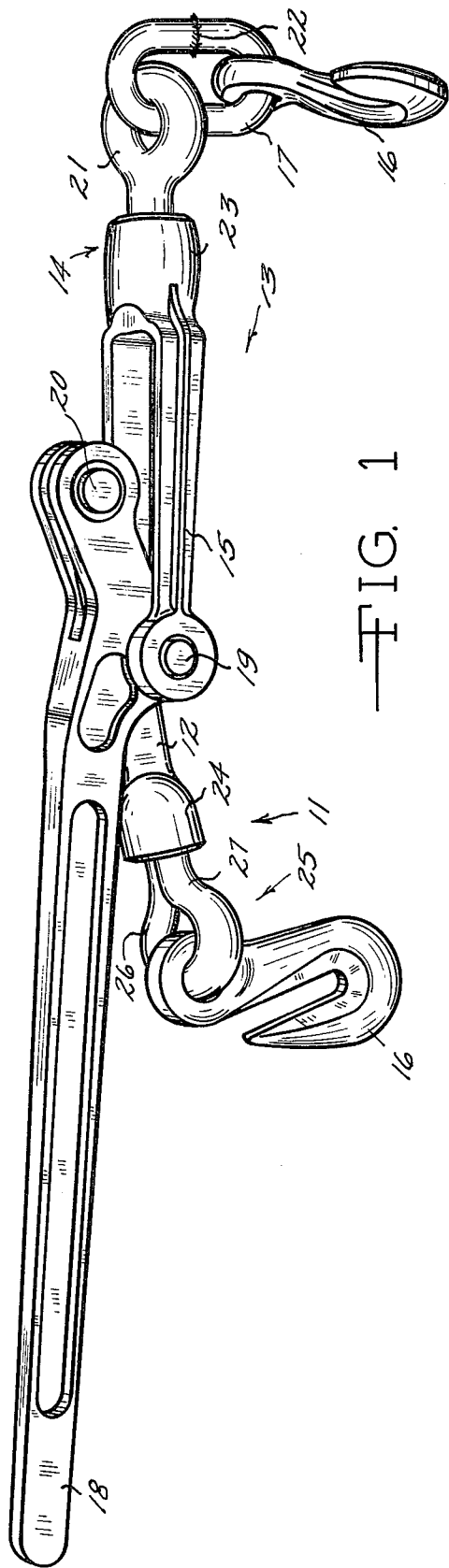
FIG. 1 is a perspective view of a cargo hold down or chain binder in which a swivel of the present invention is embodied at the rod or link end and at the clevis end a typical prior art construction is illustrated.

Referring to the drawings and with particular reference to the FIG. 1 thereof, the invention will be seen as embodied in the swivel 11 on the bar or link 12 of the chain binder 13. By contrast, a typical prior art swivel 14 is provided on the clevis piece 15 of the chain binder 13. In chain binders 13 it is characteristic to employ forged hooks 16 as the terminal implements. However, it is sometimes desirable to use an open ring or chain link 17 as the terminal implement. The hooks 16 are most usual as terminal implements because they readily are inserted in chain lengths and then the binder unit 13 is activated by pivoting of the handle 18 into the over-center position seen in the FIG. 1 which draws snug any chain attached thereto by the extent of about double the distance between pivots 19 and 20. The chain binder 13 is preferably formed from forged steel. The chain used with the binder 13 is also preferably forged but the chain link 17 between prior art conventional swivel eye 21 and hook 16 is broken and must be assembled between the hook 16 and the eye 21 as by butt welding as shown at the flank of the weld 22. In achieving the weld 22 a weld heat is necessary and embrittlement frequently occurs at or adjacent the weld 22 with consequent failure of the structure under heavy loading. The weld heat destroys the strength achieved in the part by the forging. The conventional eye 21 is secured in the swivel barrel or socket 23 in a variety of ways. By contrast, notice that the socket 24 of the present invention closes on a bifurcated eye piece 25 holding the shank end portions 26 and 27 in close relation against opening and in a swivel relationship, as will be seen, in the socket 24. The forged parts, socket 24, eye element 25 and terminal implement or hook 16 are all at forge strength as in the chain binder or cargo holder 13. The forging of the chain binder 13 and all of its attached components is desirable to provide maximum strength and toughness under severe strains and shock loads.

Figure 2:
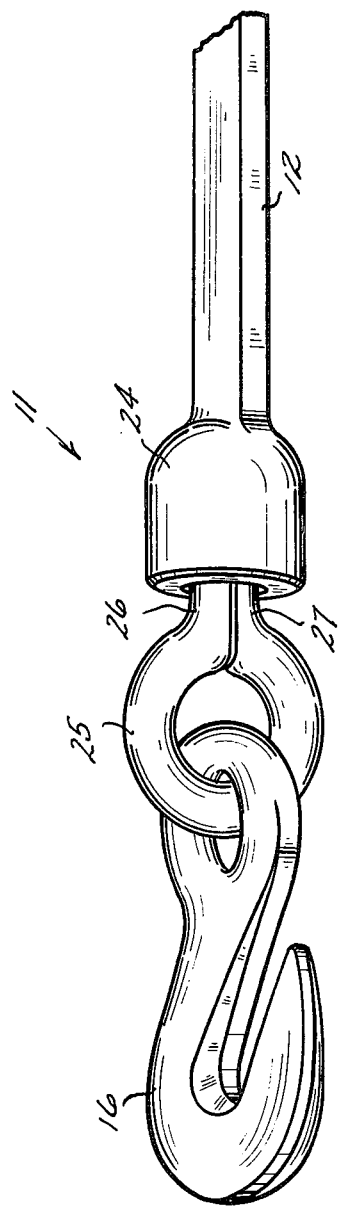
FIG. 2 is a perspective fragmental view of the swivel of the present invention at the terminal link end of the chain binder of FIG. 1.

The bifurcated eye piece 25 is better seen in the enlarged FIG. 2 which also shows the socket 24 of the swivel 11 on the binder link 12. The shank portions 26 and 27 are also shown as pressed toward each othr and the enlarged ends captured in the inner construction of the swivel 11 will be clearer as the description proceeds.

Figure 3:
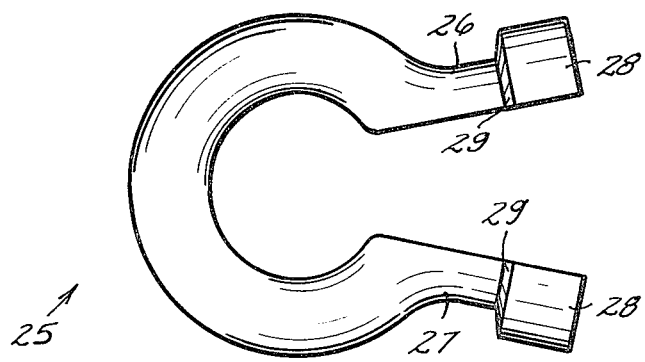
FIG. 3 is a plan view of the open eye piece as forged to embrace the hook without weld.
Figure 4:
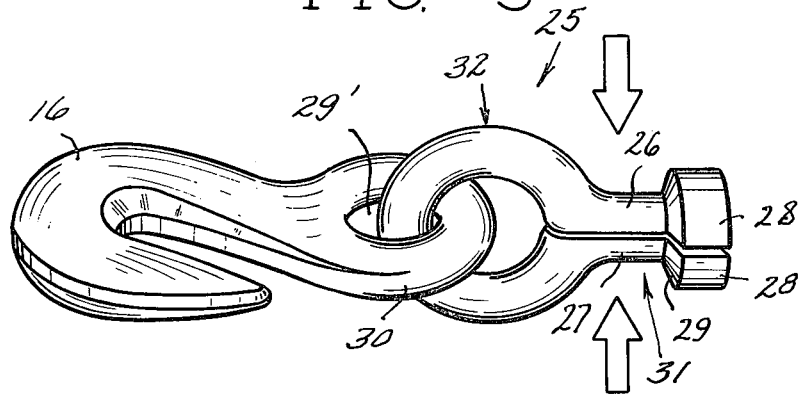
FIG. 4 is a perspective view of eye and hook and shows the step of closing the open eye in capture of the hook and with attendant heat and pressure.
Figure 5:
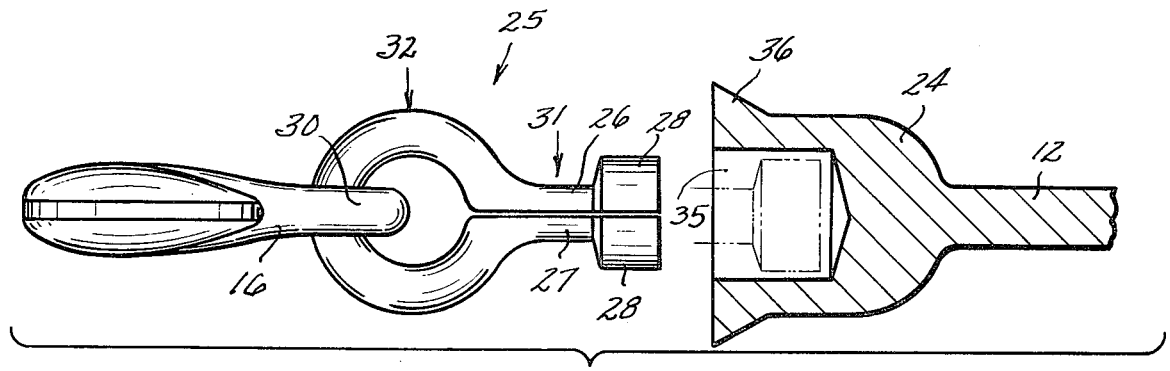
FIG. 5 is a composite elevation view and partially sectioned at the open socket and indicating the insertion of the bifurcated end of the eye and its bulged or enlarged portion into the open socket.

In the FIGS. 3-6 construction procedures in providing the new and inventive swivel 11 are best appreciated. In FIG. 3 the eye element 25 is seen as initially forged from a bar of steel to form the ultimate retaining annulus when fully assembled. The shank arms or bifurcations 26 and 27 are shown in the open forged position and semi-cylindrical enlargements 28 with draft taper 29 provides a transition between the shank arms 26 and 27 and the enlargements 28. In general, the arms 26 and 27 are forged in a semicylindrical form so that when the arms 26 and 27 are pressed together the result is a substantially cylindrical form. This is also true of the enlargements 28. From reference to FIG. 3 and then to FIG. 4, the open eye piece 25 is passed through the opening 29' defined by the annulus 30 of the terminal implement or hook 16. By application of heat and pressure, the arms 26 and 27 are brought into contact as shown forming the bifurcated shank 31 intermediate the substantially now closed ring portion 32. The force arrows indicate the closure and the closure is achieved with heat far below interference with the forge strength of the eye element 25.

Figure 6:
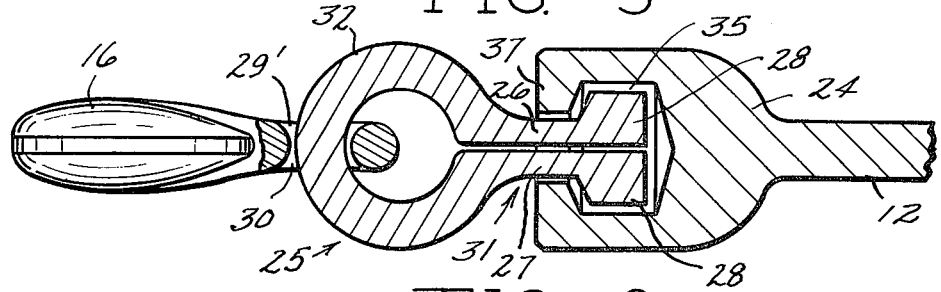
FIG. 6 is an elevation view partially sectioned as shown through the eye and socket and indicating the closure of the socket as by coining or forging to completely capture the bifurcated shank of the eye element and thereby assuring an excellent swivel performance without the necessity for an extra link between eye and hook and without the requirement of welds for hook attachment.

With the hook 16 thus attached the enlargements 28 and shank portion ends of the eye piece 25 are inserted in the open forged socket 24. In the FIG. 5 in phantom line, the insertion is indicated. In the socket 24 a cylindrical swivel pocket 35 is provided having a diameter somewhat in excess of the combined closed enlargements 28 at the end of the shank 31. A peripheral flange or skirt 36 flares outwardly around the pocket 35. The flanged portion 36 is forged or coined radially inwardly around the shank 31 as seen in FIG. 6 to form the inturned flange 37 with tapered draft internal face 38 which, when a binder is under tension, provides a substantially mating swivel taper fit between the taper faces 29 on enlarged ends 28 of the eye element 25 and the socket 24. The socket 24 is made integral with the bar or link 12 of the chain binder 13 but, as will be appreciated, could and is also formed by forging such a socket 24 in the clevis 15.

The result is a fully forged chain binder in which the swivels are effective on bifurcated arms of eye elements assembled to the terminal implement such as the hook. In some instances the eye can be left as the terminal implement as where a hook would be provided on chain used for cargo hold down. Weld embrittlement and failure is avoided in the swivel structure and a more economic construction of chain binders is possible.

While shown with a particular chain binder, the present invention is readily adaptable for swivels in the manufactures of other forged chain binders and in swivels for other heavy duty and light duty applications.

Having thus disclosed my invention and operative embodiments thereof, others may perceive inventions and improvements herein and any such improvements, modifications and changes within the skill of the art are intended to be included herein limited only by my hereinafter appended claims.

I claim:

1. A method for swivel connection of forged parts comprising:
    forging an open eye element having an eye portion and bifurcated shank portions with enlarged ends;
    inserting said forged open eye element in a part to be connected;
    closing said shank portions to close said eye by heat and pressure; and
    inserting said shank and enlargement of said eye element in a swivel socket closing said socket on said shank and over said enlarged portion of said eye element.

2. The method of producing a forged swivel for chain binders and the like comprising:
    forming by forging a terminal implement having a holding aperture therethrough;
    forming by forging an open eye element having an eye portion and bifurcated shank portion with enlargements on the ends thereof;
    forming by forging an open socket in a tension loading link and said socket having an annular integral external flange around the open end thereof;
    heating said eye element and inserting in the aperture of said terminal implement and bending with pressure said shank ends toward adjacent contact;
    inserting said shank portion and said enlarged portion at the ends of said eye element into said socket and closing said socket by deformation of said flange of said socket around the shank of said eye element and thereby retaining said eye element in swivel relation in said socket.

* * * * *